United States Patent [19]

Shibayama et al.

[11] Patent Number: 4,824,304

[45] Date of Patent: Apr. 25, 1989

[54] ROTARY WELDING MEMBER MADE OF RESIN

[75] Inventors: Teruji Shibayama; Yoshio Kaneko, both of Yokohama, Japan

[73] Assignee: Nifco, Inc., Yokohama, Japan

[21] Appl. No.: 76,572

[22] Filed: Jul. 22, 1987

[30] Foreign Application Priority Data

Jul. 23, 1986 [JP]   Japan ................................ 61-173129

[51] Int. Cl.[4] ............................................. F16B 39/06
[52] U.S. Cl. ..................................... 411/171; 411/82;
411/409; 411/908; 156/73.5; 156/295; 156/303.1
[58] Field of Search .................. 411/171, 82, 2, 258, 411/908, 409, 403; 156/73.5, 295, 303.1

[56] References Cited

U.S. PATENT DOCUMENTS

| | | | |
|---|---|---|---|
| 1,435,134 | 11/1922 | Boley | 411/487 |
| 3,378,972 | 4/1968 | Stanley | 411/82 X |
| 4,462,194 | 7/1984 | Wahner | 411/82 X |
| 4,511,189 | 11/1985 | Peterson | 411/82 X |
| 4,566,924 | 1/1986 | Hara et al. | 156/73.5 |
| 4,636,124 | 1/1987 | Gugle et al. | 411/82 |
| 4,676,707 | 6/1987 | Cearlock et al. | 411/82 X |

FOREIGN PATENT DOCUMENTS 3501715  7/1986  Fed. Rep. of Germany ..... 156/73.5

Primary Examiner—Gary L. Smith
Assistant Examiner—Curtis B. Brueske
Attorney, Agent, or Firm—Schwartz & Weinrieb

[57] ABSTRACT

A rotary welding member made of resin comprising a post portion, and a disk-shaped flange portion integrally mounted on one end of the post portion and having a plurality of ribs formed thereon in the radial direction.

22 Claims, 4 Drawing Sheets

4,824,304

ROTARY WELDING MEMBER MADE OF RESIN

FIELD OF THE INVENTION

This invention relates to a rotary welding member made of a resin material for welding the rotary welding member to a synthetic resin surface by frictional heat caused by pressing and rotating the rotary welding member relative to the synthetic resin substrate surface

BACKGROUND OF THE INVENTION

Various kinds of rotary welding members made of synthetic resin material of the type mentioned above have been proposed (for example, Japanese Patent Publication No. SHO 57-36131, and Japanese Utility Model Public Disclosure Nos. SHO 60-62613 and 60-155654).

A conventional welding member made of resin for being rotated and welded to a resin surface such as, for example, a stud 1 (FIG. 1) and fastener 2 (FIG. 2) usually has such a structure as that of a post portion 3 and is provided with a disk-shaped flange portion 4 mounted upon one end thereof, and the flange portion 4 is provided with engaging projections 5 which project from the peripheral portion at diametrically opposite portions of a welding surface thereof.

In order to mount this member made of resin on a mounting base plate made of resin, the stud 1 or the fastener 2 is, as is shown in FIG. 3, held and pressed at the desired position on a mounting base plate 6 made of resin by means of a rotary jig 7, and a cut-out section 7a of the rotary jig 7 is engaged with each engaging projection 5 and rotated at a high rate of speed (FIG. 3). Both contacting surfaces of the flange portion 4 and the mounting base plate 6 are melted by frictional heat generated at that time. After the rotation has been stopped, the melting portion cools and hardens. As a result, the stud 1 or the fastener 2 is firmly secured to the mounting base plate 6.

However, in the stud 1 or the fastener 2 of the above-described structure, the contacting surfaces of the flange portion 4 and the mounting base plate 6 are melted by frictional heat generated when the rotary welding process is performed. In addition, if the mounting base plate 6 is not thick enough, even the rear surface of the mounting base plate 6 is softened by this frictional heat. As a result, as is shown in FIG. 4(a), the rear surface of the mounting base plate 6 is expanded outwardly by means of the pressure of the rotary jig 7 against the stud 1 or the fastener 2 for performing the welding process, or as is shown in FIG. 4(b), the rear surface of the mounting base plate 6 is warped or wrinkled because of the difference in the coefficient of contraction between the flange portion 4 and the mounting base plate 6 which are melted and welded together and then cool and harden, the difference resulting from the difference in the coefficient of linear expansion between the flange portion 4 and the mounting base plate 6. In other words, so-called "set-off" occurs.

Because of the foregoing, in the case where the rear surface of the mounting base plate 6 constitutes an outer surface of the product, the appearance is significantly spoiled by this set-off.

OBJECT OF THE INVENTION

An object of the present invention is to provide a rotary welding member made of resin, wherein the set-off which often causes degrading of the outer appearance is inhibited.

SUMMARY OF THE INVENTION

In order to achieve the above-mentioned object, in the prsent invention, a flange portion of a rotary welding member made of resin is formed with a plurality of ribs on the surface opposite the mounting surface of the flange portion.

In this way, since the flange portion is formed with the ribs on the surface opposite the mounting surface of the flange portion, the frictional heat generated is effectively dissipated. In addition, since the ribs draw air onto the outer surface of the flange portion during the rotary welding process, excess heat is carried away. For the foregoing reasons, the excess heat is not transferred to the rear surface of the mounting base plate and thus expansion of the rear surface does not occur.

BRIEF DESCRIPTION OF THE DRAWINGS

The above and other objects and features of the invention will become more apparent from the following detailed description with reference to the accompanying drawings, wherein.

DETAILED DESCRIPTION OF THE PREFERRED EMBODIMENTS

Figure 5:
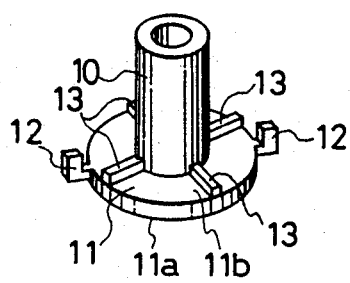
FIG. 5 is a perspective view showing a first embodiment of a stud as a rotary welding member made of resin according to the present invention.

FIG. 5 illustrates a first embodiment of a stud as a rotary welding member made of synthetic resin according to the present invention. The welding member is integrally molded of synthetic resin and as shown in the figure comprises a cylindrical post portion 10, a disk-shaped flange portion 11 formed upon one end of the post portion 10, and a pair of engaging projections 12 located upon diametrically opposite peripheral portions of the flange portion 11 and projecting away from the welding surface. The flange portion 11 has formed on a surface 11b opposite a mounting surface 11a thereof a plurality of ribs 13 extending in the radial direction. As can be seen from FIGS. 5, 6, 11, and 12, for example, each of the ribs 13 has a substantially rectangular configuration in cross-section, or in other words, a configuration wherein upstanding sidewalls thereof make or define a predetermined angle with respect to the upper surface 11b of the flange portion 11, while the upper surface of the ribs 13, interconnecting the upstanding sidewalls thereof, is spaced from the upper surface 11b of the flange portion 11 and is in the illustrated embodiment disposed substantially parallel thereto.

Figure 6:
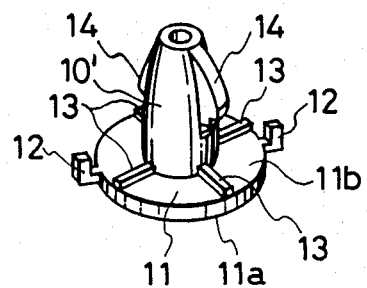
FIG. 6 is a perspective view showing a first embodiment of a fastener as the rotary welding member according to the present invention.

FIG. 6 illustrates a first embodiment of a fastener comprising a post portion 10 and a pair of elastic engaging projections 14 projecting from the post portion 10, the remainder thereof having the same structure as the stud of FIG. 5.

Figure 7:
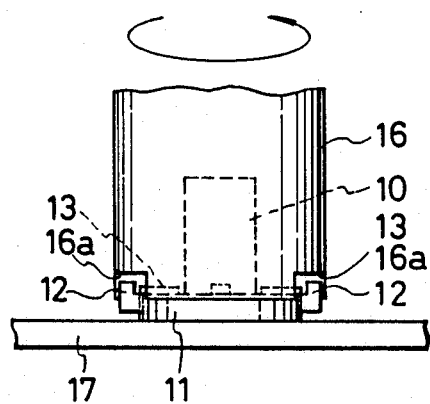
FIG. 7 is a schematic view showing the welding operation using the above-mentioned welding member.

When, as shown in FIG. 7, these welding members are held with the engaging projections 12 engaged in cut-out sections 16a of a rotary jig 16 with the flange portion 11 thereof pressed against a mounting plate 17 made of synthetic resin, and are then rotated at a high rate of speed, the contacting surface thereof is melted by means of frictional heat. Then when pressure is applied thereto after stopping the rotation, the flange portion is welded to the mounting base plate 17 (FIG. 8).

Figure 1:
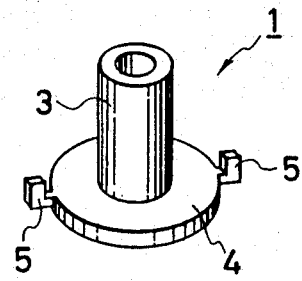
FIG. 1 is a perspective view showing a stud as one example of a conventional rotary welding member made of resin.
Figure 2:
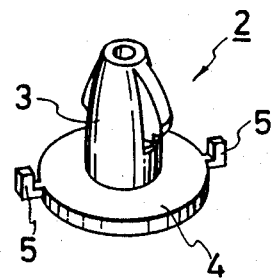
FIG. 2 is a perspective view showing a fastener as another example of a conventional rotary welding member made of resin.
Figure 3:
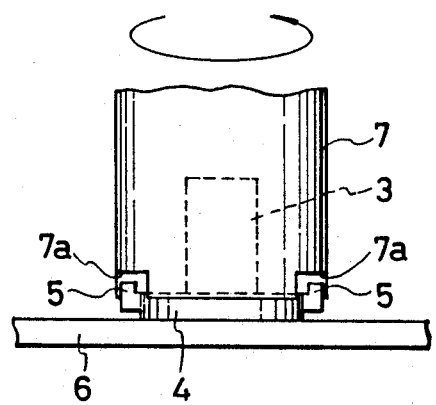
FIG. 3 is a schematic view showing the welding operation using the above-mentioned stud.
Figure 4A:
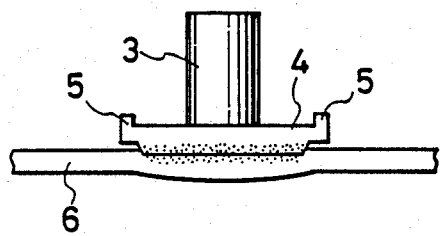
FIGS. 4(a) and 4(b) are schematic views showing states in which set-off occurs when the welding member is mounted to the base plate.
Figure 4B:
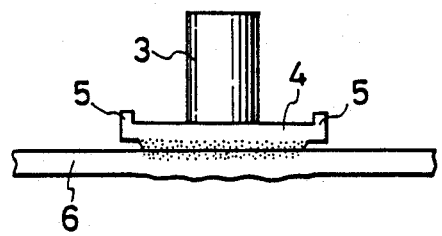

Since the ribs 13 formed on the flange portion 11 carry heat away from the flange portion 11 by drawing air thereonto during the above-mentioned rotation, excess heat does not remain in the flange portion 11. Accordingly, occurrence of the set-off at the rear surface of the mounting base plate 17 is inhibited and the rear surface of the mounting base plate 17 is not expanded as in the case with the conventional device shown in FIG. 4.

Figure 8:
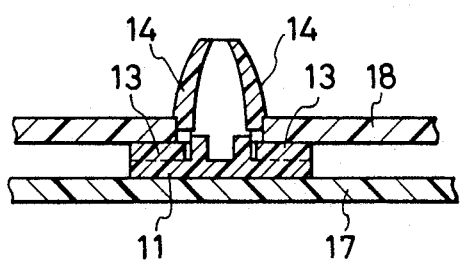
FIG. 8 is a sectional view showing a state in which the fastener is mounted on a base plate.

In FIG. 8, one example is shown in which a fastener is welded to the base plate 17 and in which, by properly setting the height of the ribs 13 in relation to the thickness of a plate 18 to be fastened, the plates can be mounted on the base plate 17 by means of the lower ends of the elastic projections 14 formed on the post portion 10 and the upper surfaces of the ribs 13 so as to be separated from the base plate 17 by means of a predetermined distance.

Figure 9:
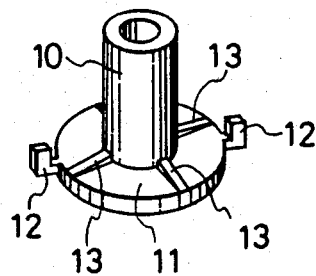
FIG. 9 is a perspective view showing a second embodiment of a stud according to the present invention.
Figure 10:
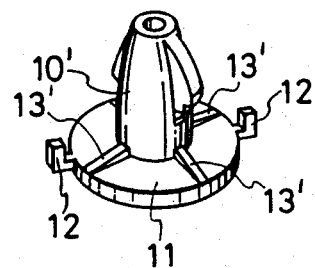
FIG. 10 is a perspective view showing a second embodiment of a fastener according to the present invention.

FIG. 9 illustrates a second embodiment of a stud, and FIG. 10 illustrates a second embodiment of a fastener. In both embodiments the height of the ribs formed on the flange portion 11 decrease towards the peripheral portion.

Figure 11:
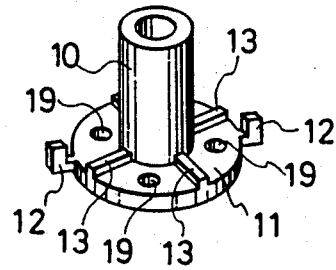
FIG. 11 is a perspective view showing a third embodiment of a stud according to the present invention.
Figure 12:
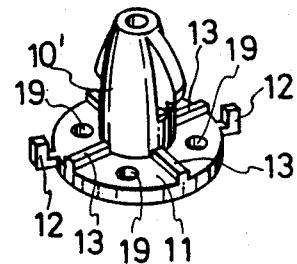
FIG. 12 is a perspective view showing a third embodiment of a fastener according to the present invention.

FIG. 11 illustrates a third embodiment of a stud and FIG. 12 illustrates a third embodiment of a fastener. In both of these embodiments the flange portion 11 is formed not only with the plurality of ribs 13 but also with a plurality of through holes 19 in the direction of the thickness of the flange portion 11. By virtue of the provision of these through holes, the dissipation of excess heat of the flange portion 11 can be further enhanced during the rotary welding process. In addition, by virtue of the provision of the plurality of through holes 19, the deformation of the base plate 17 by means of the flange portion 11 during cooling and contracting is prevented. Accordingly, little wrinkling or warping occurs at the rear surface of the mounting base plate 17, differently from the case shown in FIG. 4.

As described in the foregoing, the rotary welding member made of resin according to the present invention is constructed in such a manner as to enhance the heat dissipation effect. Accordingly, the occurrence of the set-off at the rear surface of the mounting base plate can be inhibited.

Obviously, many modifications and variations of the present invention are possible in light of the above teachings. It is therefore to be understood that within the scope of the appended claims, the prsent invention may be practiced otherwise than as specifically described herein.

What is claimed is:

1. A rotary welding member integrally molded of synthetic resin material, comprising:
   a post portion;
   a disk-shaped flange portion integrally mounted upon one end of said post portion;
   means mounted upon said rotary welding member for enabling high-speed rotation of said rotary welding member by means of a high-speed rotating tool;
   said disk-shaped flange portion having a first surface to be friction welded to a substrate as a result of partial melting of said first surface of said disk-shaped flange portion in response to heat generated between said first surface of said disk-shaped flange portion and said substrate as a result of friction developed between said first surface of said disk-shaped flange portion and said substrate during said high-speed rotation of said welding member by said high-speed rotating tool while in contact with said substrate; and
   three or more radially extending ribs formed upon a second surface of said disk-shaped flange portion opposite said first surface for causing cooling air to flow across said second surface of said disk-shaped flange portion in order to dissipate an excess portion of said generated heat so as to prevent deterioration of said substrate.

2. The rotary welding member as claimed in claim 1, wherein said ribs decline in height towards the periphery of the flange portion.

3. The rotary welding member as claimed in claim 1, wherein the flange portion is formed therein with a plurality of holes in the direction of thickness thereof.

4. The rotary welding member as set forth in claim 1, wherein:
   four ribs are equiangularly disposed about a longitudinal axis of said rotary welding member.

5. The rotary welding member as set forth in claim 1, wherein:
   said rotary welding member is a stud.

6. The rotary welding member as set forth in claim 1, wherein:
   said rotary welding member is a fastener.

7. The rotary welding member as set forth in claim 1, wherein:
   said high-speed rotating enabling means are mounted upon said disk-shaped flange portion of said rotary welding member.

8. The rotary welding member as set forth in claim 7, wherein:
   said high-speed rotating enabling means are mounted upon exterior peripheral portions of said disk-shaped flange portion of said rotary welding member.

9. The rotary welding member as set forth in claim 8, wherein:

said high-speed rotating enabling means comprises a pair of diametrically oppositely disposed projections.

10. The rotary welding member as set forth in claim 2, wherein:
four ribs are equiangularly disposed about a longitudinal axis of said rotary welding member.

11. The rotary welding member as set forth in claim 2, wherein:
said rotary welding member is a stud.

12. The rotary welding member as set forth in claim 2, wherein:
said rotary welding member is a fastener.

13. The rotary welding member as set forth in claim 2, wherein:
said high-speed rotating enabling means are mounted upon said disk-shaped flange portion of said rotary welding member.

14. The rotary welding member as set forth in claim 13, wherein:
said high-speed rotating enabling means are mounted upon exterior peripheral portions of said disk-shaped flange portion of said rotary welding member.

15. The rotary welding member as set forth in claim 14, wherein:
said high-speed rotating enabling means comprises a pair of diametrically opposed projections.

16. The rotary welding member as set forth in claim 3, wherein:
four ribs are equiangularly disposed about a longitudinal axis of said rotary welding member.

17. The rotary welding member as set forth in claim 3, wherein:
four of said holes are equiangularly disposed about a longitudinal axis of said rotary welding member.

18. The rotary welding member as set forth in claim 3, wherein:
said rotary welding member is a stud.

19. The rotary welding member as set forth in claim 3, wherein:
said rotary welding member is a fastener.

20. The rotary welding member as set forth in claim 3, wherein:
said high-speed rotating enabling means comprises a pair of diametrically opposed projections mounted upon exterior peripheral portions of said disk-shaped flange portion of said rotary welding member.

21. A rotary welding member integrally molded of synthetic resin material, comprising:
a post portion;
a disk-shaped flange portion integrally mounted upon one end of said post portion;
means mounted upon said rotary welding member for enabling high-speed rotation of said rotary welding member by means of a high-speed rotating tool;
said disk-shaped flange portion having a first surface to be friction welded to a substrate as a result of partial melting of said first surface of said disk-shaped flange portion in response to heat generated between said first surface of said disk-shaped flange portion and said substrate as a result of friction developed between said first surface of said disk-shaped flange portion and said substrate during said high-speed rotation of said welding member by said high-speed rotating tool while in contact with said substrate; and
a plurality of radially extending ribs, each of which has a substantially rectangular configuration in cross-section, formed upon a second surface of said disk-shaped flange portion opposite said first surface for causing cooling air to flow across said second surface of said disk-shaped flange portion in order to dissipate an excess portion of said generated heat so as to prevent deterioration of said substrate.

22. A rotary welding member integrally molded of synthetic resin material, comprising:
a post portion;
a disk-shaped flange portion integrally mounted upon one end of said post portion;
means mounted upon said rotary welding member for enabling high-speed rotation of said rotary welding member by means of a high-speed rotating tool;
said disk-shaped flange portion having a first surface to be friction welded to a substrate as a result of partial melting of said first surface of said disk-shaped flange portion in response to heat generated between sadi first surface of said disk-shaped flange portion and said substrate as a result of friction developed between said first surface of said disk-shaped flange portion and said substrate during said high-speed rotation of said welding member by said high-speed rotating tool while in contact with said substrate; and
a plurality of radially extending ribs, each of which has a cross-sectional configuration defined by means of upstanding sidewalls, extending at predetermined angles with respect to a second surface of said disk-shaped flange portion opposite said first surface, and an upper surface interconnecting the upper ends of said upstanding sidewalls and spaced above said second surface of said disk-shaped flange portion, for causing cooling air to flow across said second surface of said disk-shaped flange portion in order to dissipate an excess portion of said generated heat so as to prevent deterioration of said substrate.

* * * * *